United States Patent
Guo et al.

(10) Patent No.: US 11,658,344 B2
(45) Date of Patent: May 23, 2023

(54) WOUND-TYPE ELECTRODE ASSEMBLY

(71) Applicant: Ningde Amperex Technology Limited, Fujian (CN)

(72) Inventors: Peipei Guo, Fujian (CN); Liangzhen Xiao, Fujian (CN); Wei Gao, Fujian (CN); Kefei Wang, Fujian (CN); Yi Zhao, Fujian (CN); Ping He, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 261 days.

(21) Appl. No.: 16/194,539

(22) Filed: Nov. 19, 2018

(65) Prior Publication Data
US 2019/0089005 A1 Mar. 21, 2019

Related U.S. Application Data

(63) Continuation of application No. PCT/CN2016/087027, filed on Jun. 24, 2016.

(51) Int. Cl.
*H01M 10/0587* (2010.01)
*H01M 10/04* (2006.01)
(Continued)

(52) U.S. Cl.
CPC ......... *H01M 10/0587* (2013.01); *H01M 4/70* (2013.01); *H01M 10/0431* (2013.01); *H01M 50/536* (2021.01); *H01M 10/0525* (2013.01)

(58) Field of Classification Search
None
See application file for complete search history.

(56) References Cited

U.S. PATENT DOCUMENTS

| 4,709,472 A * | 12/1987 | Machida | H01M 6/10 29/623.1 |
| 2006/0147793 A1* | 7/2006 | Kim | H01M 4/70 429/94 |

(Continued)

FOREIGN PATENT DOCUMENTS

| CN | 102437378 A | 5/2012 |
| CN | 102484240 A | 5/2012 |

(Continued)

OTHER PUBLICATIONS

International Search Report of PCT Patent Application No. PCT/CN2016/087027 dated Mar. 28, 2017.
(Continued)

*Primary Examiner* — Haroon S. Sheikh
(74) *Attorney, Agent, or Firm* — Morgan, Lewis & Bockius LLP (57) ABSTRACT

The present disclosure provides a wound-type electrode assembly comprising a first and second electrode plates, a first and second electrode tabs, and a separator. The first and second electrode plates include a first current collector and active substance layer, and a second current collector and active substance layer. Two surfaces of the first current collector of the first winding start section of the first electrode plate are not coated with first active substance layer and defined as a first start blank current collector, the first start blank current collector is welded to a first electrode tab. The second pole piece comprises a second groove, a bottom of which is a second current collector and a circumference thereof is a second active substance layer; the second electrode tab is accommodated in the second groove and electrically connected to the second current collector at the second groove.

17 Claims, 10 Drawing Sheets

(51) Int. Cl.
  *H01M 50/536* (2021.01)
  *H01M 4/70* (2006.01)
  *H01M 10/0525* (2010.01)

(56) References Cited

U.S. PATENT DOCUMENTS

| | | | | |
|---|---|---|---|---|
| 2009/0297929 | A1* | 12/2009 | Uchida | H01M 10/0431 |
| | | | | 429/94 |
| 2010/0035144 | A1* | 2/2010 | Oh | H01M 50/566 |
| | | | | 429/211 |
| 2011/0111276 | A1* | 5/2011 | Sato | H01M 10/0431 |
| | | | | 429/94 |
| 2012/0219845 | A1* | 8/2012 | Chiba | H01M 10/0585 |
| | | | | 429/153 |
| 2013/0316207 | A1* | 11/2013 | Suwa | H01M 10/05 |
| | | | | 429/94 |

FOREIGN PATENT DOCUMENTS

| | | |
|---|---|---|
| CN | 203119046 U | 8/2013 |
| CN | 203733873 U | 7/2014 |
| CN | 204204984 U | 3/2015 |
| CN | 204577504 U | 8/2015 |
| CN | 204809314 U | 11/2015 |
| CN | 205828573 U | 12/2016 |

OTHER PUBLICATIONS

Ningde Amperex Technology Limited, Office Action, CN201680083816.2, dated Jan. 14, 2021, 6 pgs.

Ningde Amperex Technology Limited, Office Action, CN201680083816.2, dated Aug. 18, 2020, 8 pgs.

\* cited by examiner

WOUND-TYPE ELECTRODE ASSEMBLY

CROSS-REFERENCE TO RELATED APPLICATIONS

This Application is a Continuation Application of International Application No. PCT/CN2016/087027 filed on Jun. 24, 2016, the content of which is incorporated herein by reference in its entirety.

FIELD OF THE INVENTION

The present invention relates to the field of battery, in particular, to a wound-type electrode assembly.

BACKGROUND OF THE INVENTION

Figure 1:
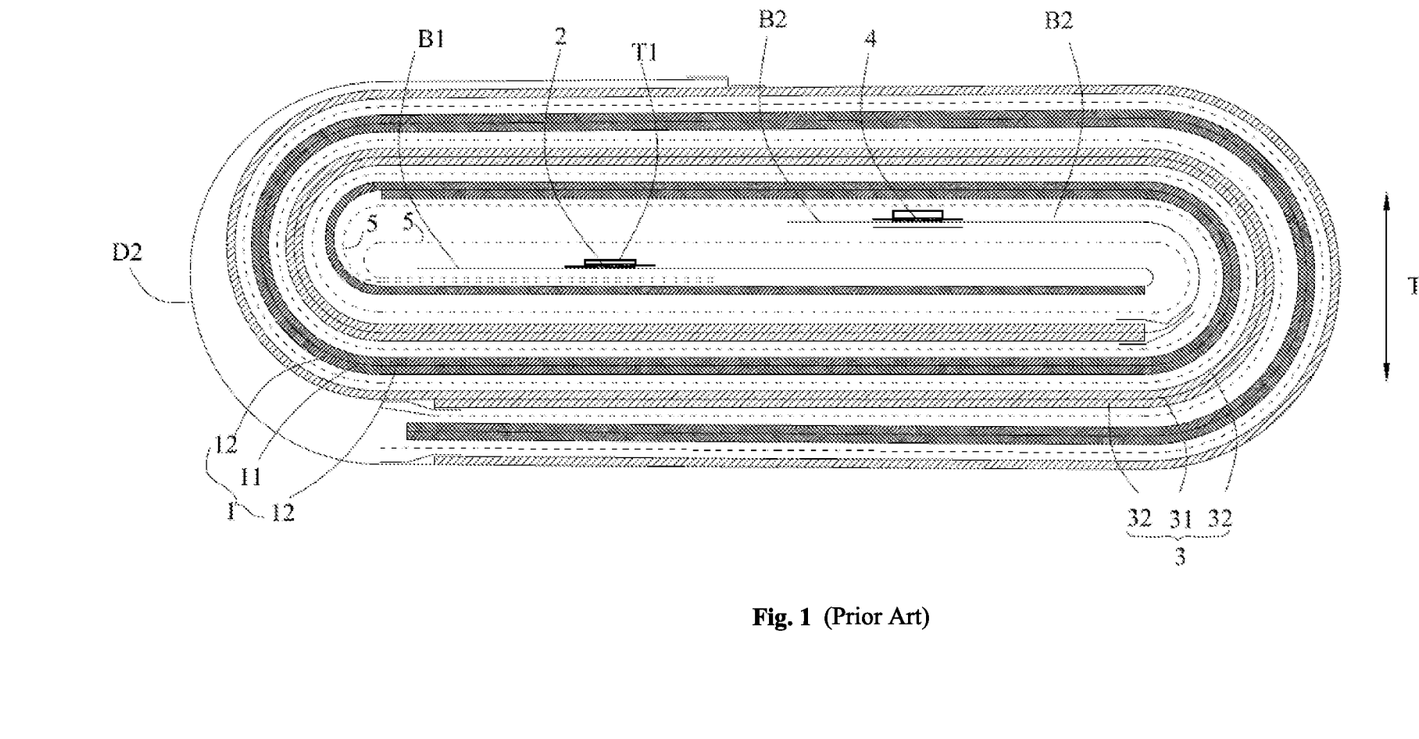
FIG. 1 illustrates a schematic view of winding of an embodiment of a wound-type electrode assembly in the prior art.
Figure 2:
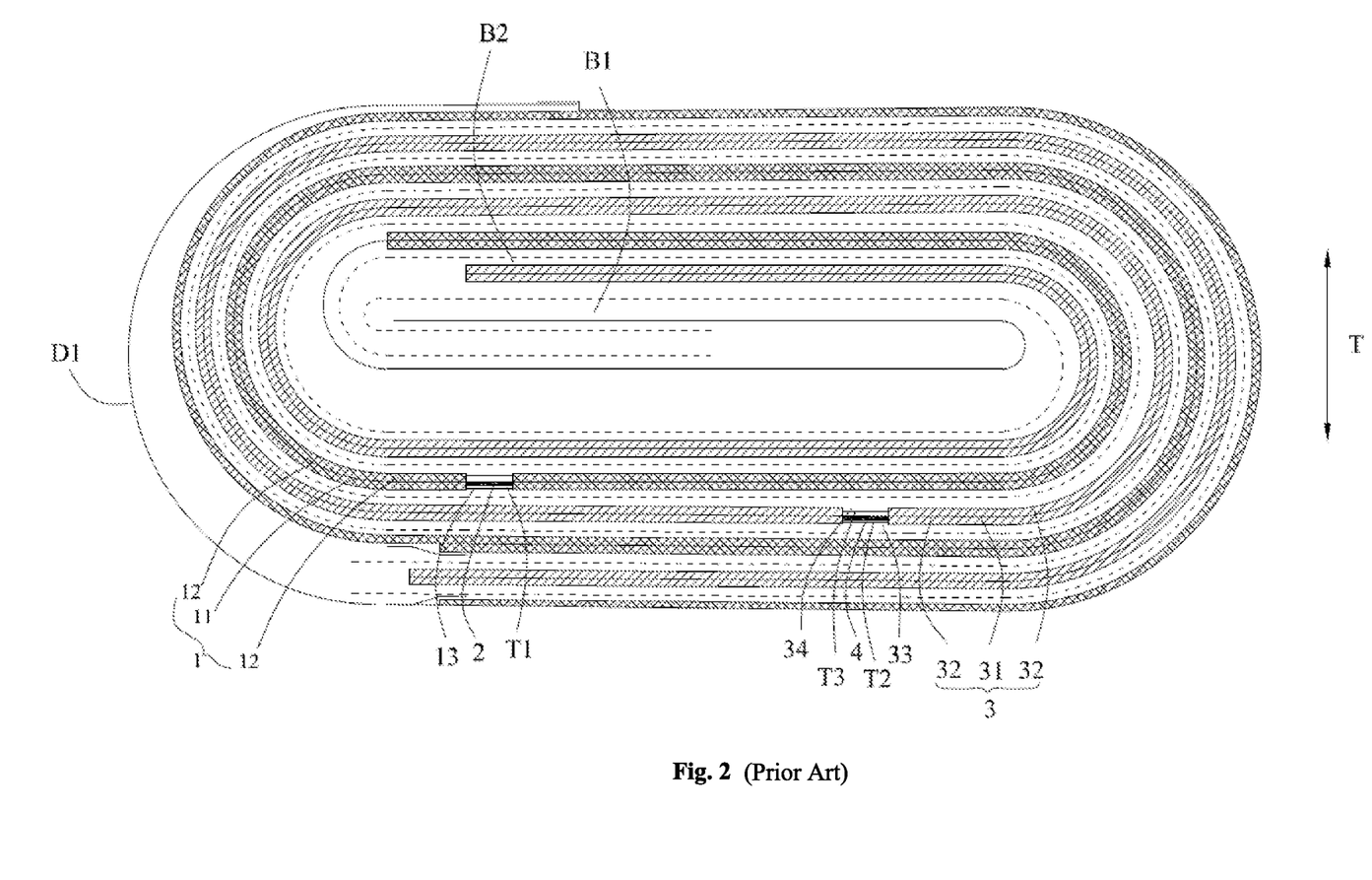
FIG. 2 illustrates a schematic view of winding of another embodiment of a wound-type electrode assembly in the prior art.

FIG. 1 illustrates a schematic view of winding of an embodiment of a wound-type electrode assembly in the prior art. The wound-type electrode assembly includes a first electrode plate 1, a first electrode tab 2, a second electrode plate 3, a second electrode tab 4 and a separator 5. Among them, a start of the first electrode plate 1 (i.e. a first winding start section B1) and a start of the second electrode plate 3 (i.e. a second winding start section B2) are blank current collectors, the first electrode tab 2 and the second electrode tab 4 are respectively welded to the blank current collectors of the starts of the first electrode plate 1 and the second electrode plate 3, and then the first electrode tab 2 and the second electrode tab 4 are respectively bonded with an insulating adhesive. FIG. 2 illustrates a schematic view of winding of another embodiment of a wound-type electrode assembly in the prior art, wherein a middle of the first electrode plate 1 and a middle of the second electrode plate 3 are respective provided with a first groove 13 and a second groove 33, and the first electrode tab 2 and the second electrode tab 4 are respective accommodated in the first groove 13 on the first electrode plate 1 and the second groove 33 on the second electrode plate 3.

The wound-type electrode assembly in FIG. 1 causes the position of the first electrode tab 2 and the position of the second electrode tab 4 to become the maximum thickness region of the battery, and the space of the wound-type electrode assembly other than the first electrode tab 2 and the second electrode tab 4 is wasted, resulting in a lower energy density of the electrode assembly. In addition, since the first electrode tab 2 and the second electrode tab 4 are located at the start of the first electrode plate 1 and the start of the second electrode plate 3, respectively, so that the DC resistance (DCR) of the wound-type electrode assembly is large. The wound-type electrode assembly in FIG. 2 is easily deformed during cycling and has a large cycle expansion ratio.

SUMMARY OF THE INVENTION

In view of the problems in the background art, the present disclosure provides a wound-type electrode assembly, which improves energy density of the electrode assembly and reduces an internal resistance, while solving the problem that the electrode assembly is easily deformed and the cycle expansion ratio is large during the cycle use of the electrode assembly.

A wound-type electrode assembly includes a first electrode plate, a first electrode tab, a second electrode plate, a second electrode tab, and a separator.

The first electrode plate includes a first current collector, and a first active substance layer coated on the surface of the first current collector. The second electrode plate includes a second current collector, and a second active substance layer coated on a surface of the second current collector. A separator is disposed between the first electrode plate and the second electrode plate to isolate the first electrode plate from the second electrode plate.

Among them, the first electrode plate includes a first winding start section, two surfaces of the first current collector of the first winding start section are not coated with the first active substance layer and are defined as a first start blank current collector, and the first electrode tab is fixed to the first start blank current collector. A middle of the second electrode plate includes a second groove, a bottom of the second groove is the second current collector and a circumference thereof is the second active substance layer. The second electrode tab is accommodated in the second groove and electrically connected to the second current collector at the second groove.

The beneficial effect of the disclosure is as below:

In the wound-type electrode assembly according to the present disclosure, the first electrode tab is welded to the first start blank current collector, the middle of the second electrode plate is formed with the second groove, and the second electrode tab is accommodated in the second groove and electrically connected to the second current collector at the second groove. Compared with the wound-type electrode assembly shown in FIG. 1, the wound-type electrode assembly of the present disclosure obviously reduces the internal resistance of the wound-type electrode assembly and increases the energy density of the electrode assembly because the first electrode tab and the second electrode tab are not simultaneously arranged on the starts of the corresponding electrode plates. Compared with the wound-type electrode assembly shown in FIG. 2, the wound-type electrode assembly of the present disclosure is not more easily to deform during the cycle of the wound-type electrode assembly and reduces a cyclic expansion rate of the wound-type electrode assembly.

Among those, the reference numerals are as follows:

| 1 | first electrode plate | B2 | second winding start section |
|---|---|---|---|
| 11 | first current collector | D2 | second winding end section |
| 111 | first start blank current collector | 4 | second electrode tab |
| 112 | first end blank current collector | | |
| 12 | first active substance layer | 5 | separator |
| 13 | first groove | T1 | first double-sided insulating tape |
| B1 | first winding start section | T2 | second double-sided insulating tape |
| D1 | first winding end section | T3 | third double-sided insulating tape |
| 2 | first electrode tab | 6 | third electrode tab |
| 3 | second electrode plate | 7 | fourth electrode tab |
| 31 | second current collector | T | thickness direction |
| 32 | second active substance layer | W | width direction |
| 33 | second groove | | |
| 34 | third groove | | |

DETAILED DESCRIPTION OF THE PREFERRED EMBODIMENTS

A wound-type electrode assembly according to the present disclosure will be described in detail below with reference to the accompanying FIGS. 3 to 15.

With reference to FIGS. 3, 9, 10 and 11, the wound-type electrode assembly according to present disclosure includes a first electrode plate 1, a first electrode tab 2, a second electrode plate 3, a second electrode tab 4 and an separator 5.

The first electrode plate 1 includes a first current collector 11, and a first active substance layer 12 coated on the surface of the first current collector 11. The second electrode plate 3 includes a second current collector 31, and a second active substance layer 32 coated on the surface of the second current collector 31. A separator 5 is disposed between the first electrode plate 1 and the second electrode plate 3 to isolate the first electrode plate 1 from the second electrode plate 3.

Among them, the first electrode plate 1 may include a first winding start section B1. Two surfaces of the first current collector 11 of the first winding start section B1 are not coated with the first active substance layer 12 and are defined as a first start blank current collector 111, and the first electrode tab 2 is welded to the first start blank current collector 111. A middle of the second electrode plate 3 (the portion between the second winding start section B2 and the second winding end section D2 of the second electrode plate 3, as described below) includes a second groove 33, a bottom of the second groove 33 is a second current collector 31 and a circumference thereof is a second active substance layer 32. The second electrode tab 4 is accommodated in the second groove 33 and electrically connected to the second current collector 31 at the second groove 33.

In the wound-type electrode assembly according to the present disclosure, the first electrode tab 2 is fixed (e.g. welded or bonded) to the first start blank current collector 111, the second electrode tab 4 is accommodated in the second groove 33 disposed in the middle of the second electrode plate 3 and is electrically connected to the second current collector 31 at the second groove 33. Compared with the wound-type electrode assembly shown in FIG. 15, the wound-type electrode assembly of the present disclosure obviously reduces an internal resistance of the wound-type electrode assembly and increases energy density of the electrode assembly because the first electrode tab 2 and the second electrode tab 4 are not simultaneously arranged on a winding start section of the corresponding electrode plates. Compared with the wound-type electrode assembly shown in FIG. 1, the wound-type electrode assembly of the present disclosure is not more easily to deform during the cycle of the wound-type electrode assembly and reduces a cyclic expansion rate of the wound-type electrode assembly.

Figure 5:
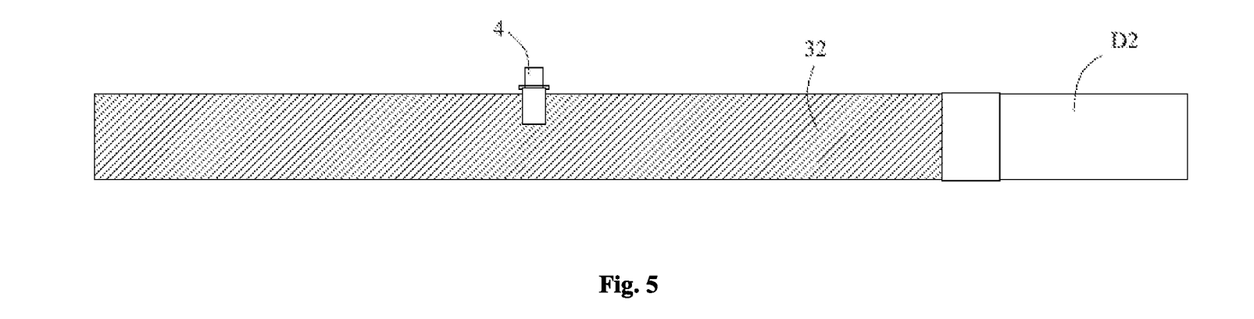
FIG. 5 illustrates a bottom view of FIG. 4.

According to the wound-type electrode assembly of the present disclosure, in some embodiments, with reference to FIG. 5, the circumference of the second groove 33 may be close on three sides and open on one side.

Figure 6:
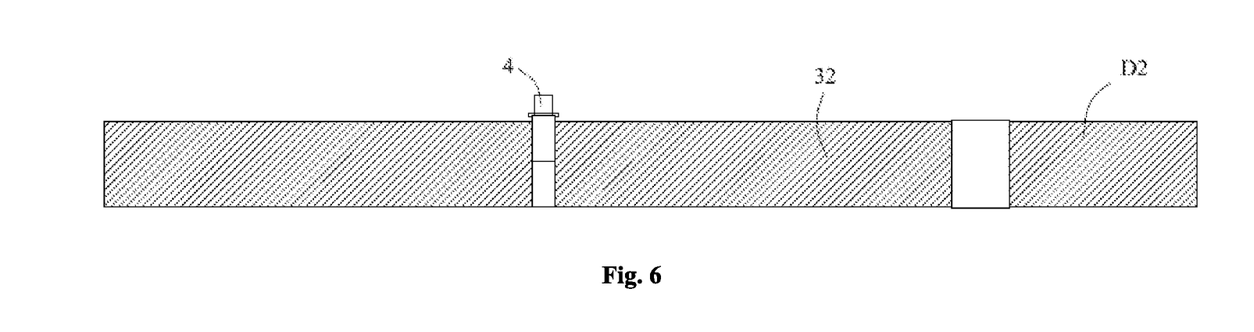
FIG. 6 illustrates a deformation view of FIG. 5.
Figure 7:
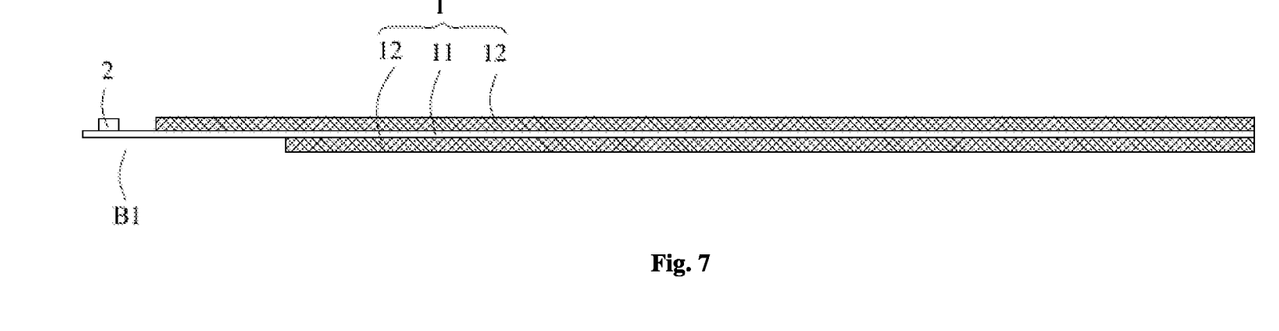
FIG. 7 illustrates a schematic view of the first electrode plate of FIG. 3 after unfolding.
Figure 8:
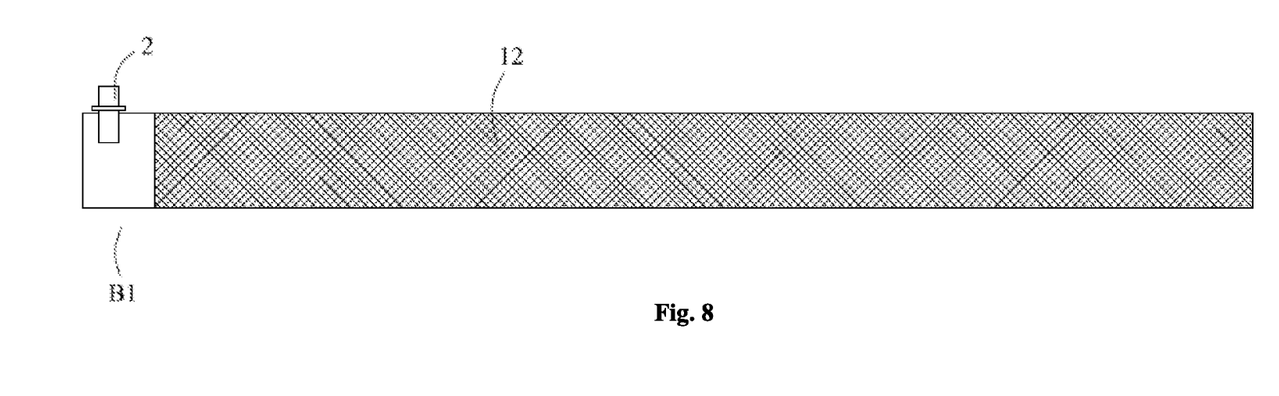
FIG. 8 illustrates a top view of FIG. 7.

In some embodiments, with reference to FIG. 6, the circumference of the second groove 33 may be close on two sides and open on two sides. After the wound-type electrode assembly is charged and discharged, the second active substance layer 32 not only expands along a thickness direction of the second electrode plate 3 (i.e., a thickness direction T of the wound-type electrode assembly), thereby increasing the thickness of the wound-type electrode assembly, but also the second active substance layer 32 also expands along a length direction of the second electrode plate 3 (i.e., a width direction W of the wound-type electrode assembly), thereby squeezing the thickness direction T of the wound-type electrode assembly to further increase the thickness of the wound-type electrode assembly. Since the circumference of the second groove 33 is close on two sides and open on two sides, so that the expansion force along the length direction of the second electrode plate 3 is effectively released, so that the thickness direction T is not squeezed and the thickness of the wound-type electrode assembly is reduced to some extent.

In some embodiments, with reference to FIGS. 3, 9, 10 and 11, the second electrode plate 3 may include a second winding start section B2. In the width direction(W) of the wound-type electrode assembly, the first winding start section B1 and the second winding start section B2 respectively extend toward opposite directions (as shown in FIGS. 3, 9, 10 and 11). In some embodiments, in the width direction(W) of the wound-type electrode assembly, the first winding start section B1 and the second winding start section B2 extend toward the same direction, as shown in FIGS. 1 and 2.

In some embodiments, two surfaces of the second current collector 31 of the second winding start section B2 are coated with the second active substance layer 32. Coating the second active substance layer 32 on the two surfaces of the second current collector 31 of the second winding start section B2 improve the energy density of the wound-type electrode assembly.

Figure 9:
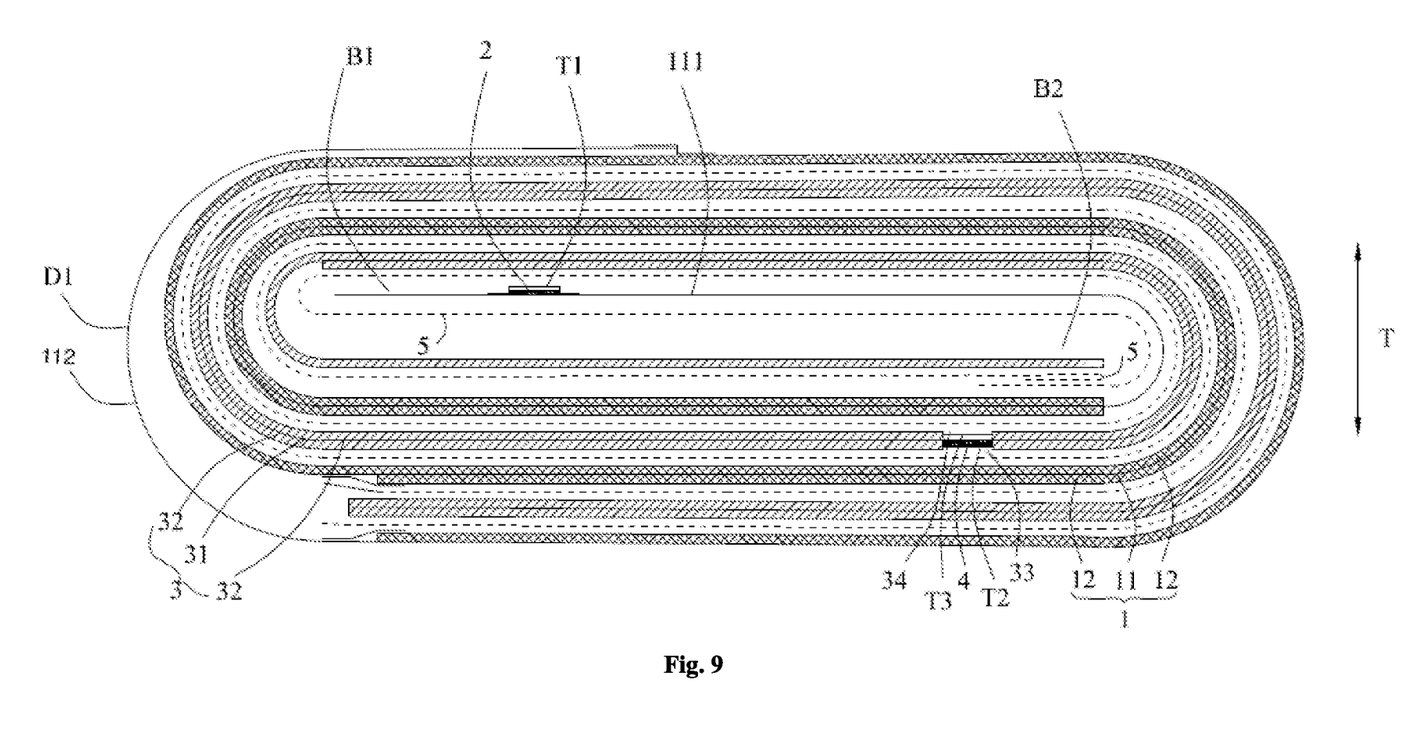
FIG. 9 illustrates a schematic view of winding of another embodiment of a wound-type electrode assembly according to the present disclosure.
Figure 10:
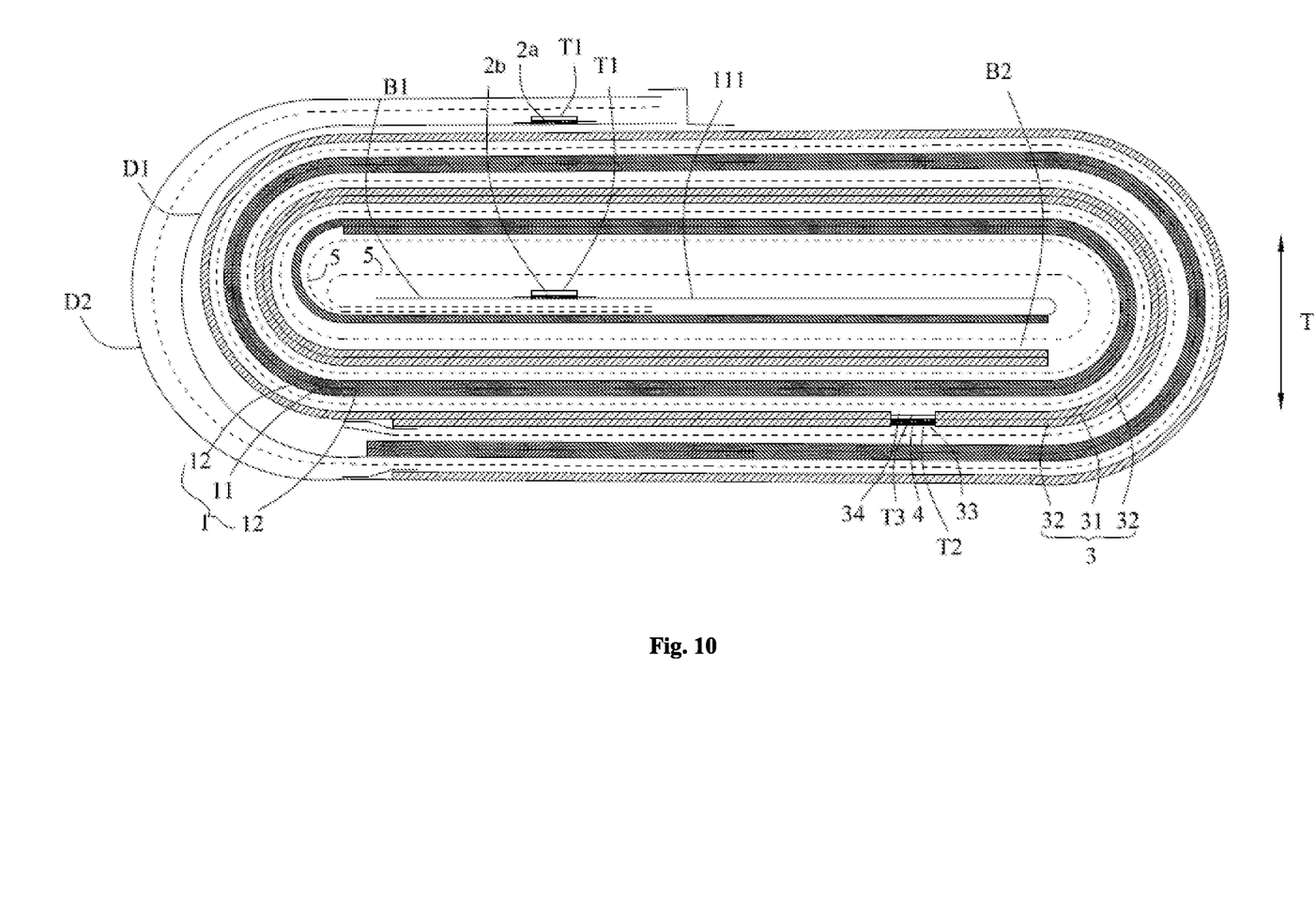
FIG. 10 illustrates a deformation view of FIG. 9, wherein the first electrode tab includes two first electrode tab units.
Figure 11:
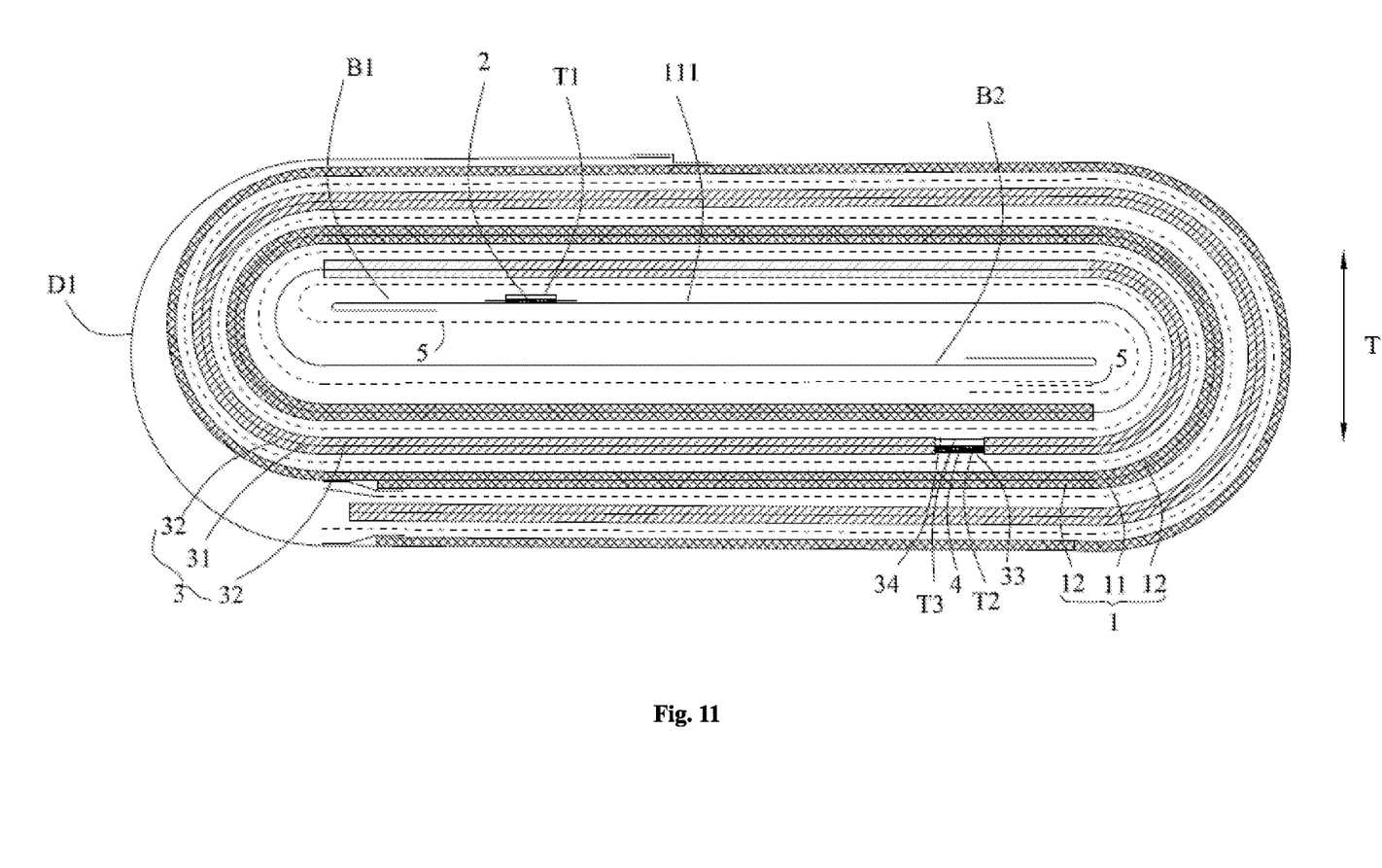
FIG. 11 illustrates another deformation view of FIG. 9.

In some embodiments, with reference to FIGS. 9, 10 and 11, the first electrode plate 1 may further include a first winding end section D1. Two surfaces of the first current collector 11 of the first winding end section D1 are not coated with the first active substance layer 12 and are defined as a first end blank current collector 112.

In some embodiments, with reference to FIGS. 10 and 11, the first electrode tab 2 may include two first electrode tab units, and the two first electrode tab units (2a, 2b) are substantially aligned in the thickness direction T of the wound-type electrode assembly. Among them, one of the first electrode tab units (2a, 2b) is welded to the first start blank current collector 111 and the other of the first electrode tab units (2a, 2b) is welded to the first end blank current collector 112, so that the DC resistance (DCR) of the wound-type electrode assembly and the heat generation of the electrode assembly during charging and discharging are reduced, and the current density distribution of the electrode assembly is more uniform.

Figure 12:
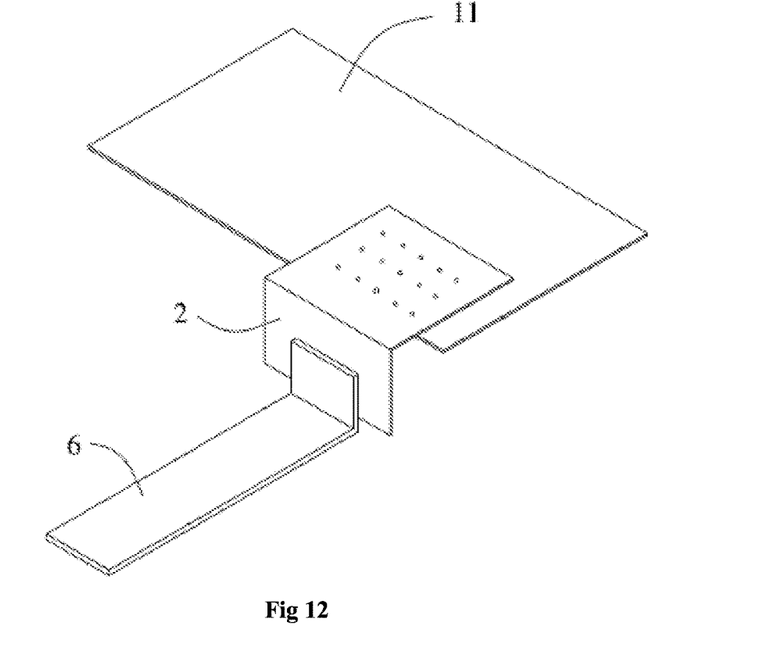
FIG. 12 illustrates a perspective view of welding of the first electrode tab and the third electrode tab of FIG. 3.
Figure 13:
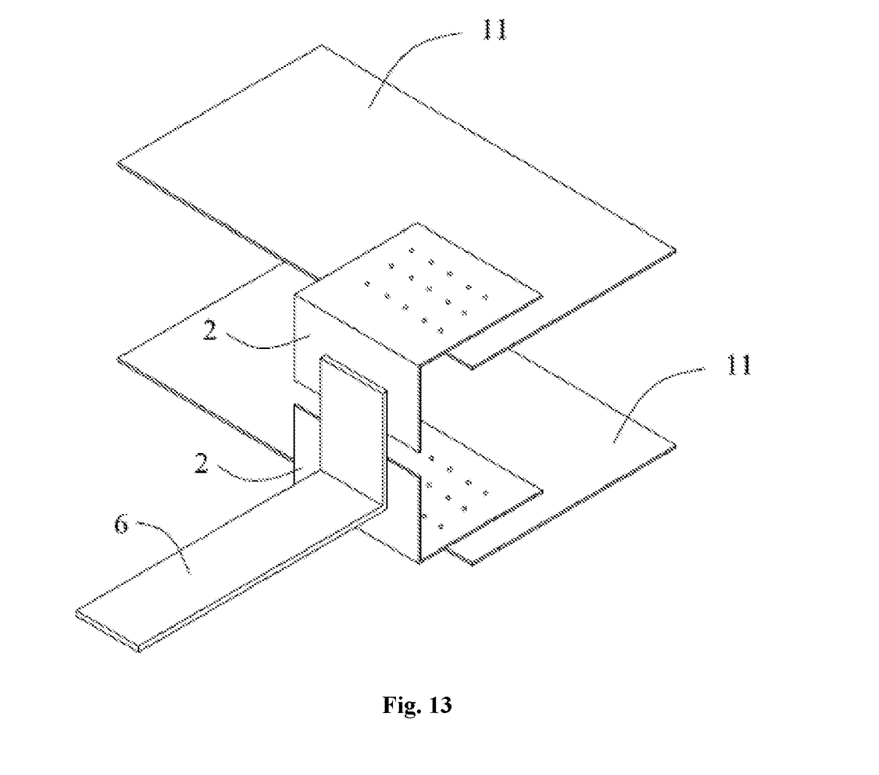
FIG. 13 illustrates a perspective view of welding of the first electrode tab and the third electrode tab of FIG. 10.

In some embodiments, with reference to FIGS. 12 and 13, the wound-type electrode assembly may further include a third electrode tab 6 welded to one end of the first electrode tab 2 extending to the outside of the wound-type electrode assembly.

In some embodiments, a width of the third electrode tab 6 is less than a width of the first electrode tab 2, and a thickness of the third electrode tab 6 is greater than a thickness of the first electrode tab 2, so that the maximum thickness of the electrode assembly after welding of the first electrode tab 2 is reduced and the energy density of the electrode assembly is increased while ensuring the strength and overcurrent cross-sectional area of the third electrode tab 6.

Figure 3:
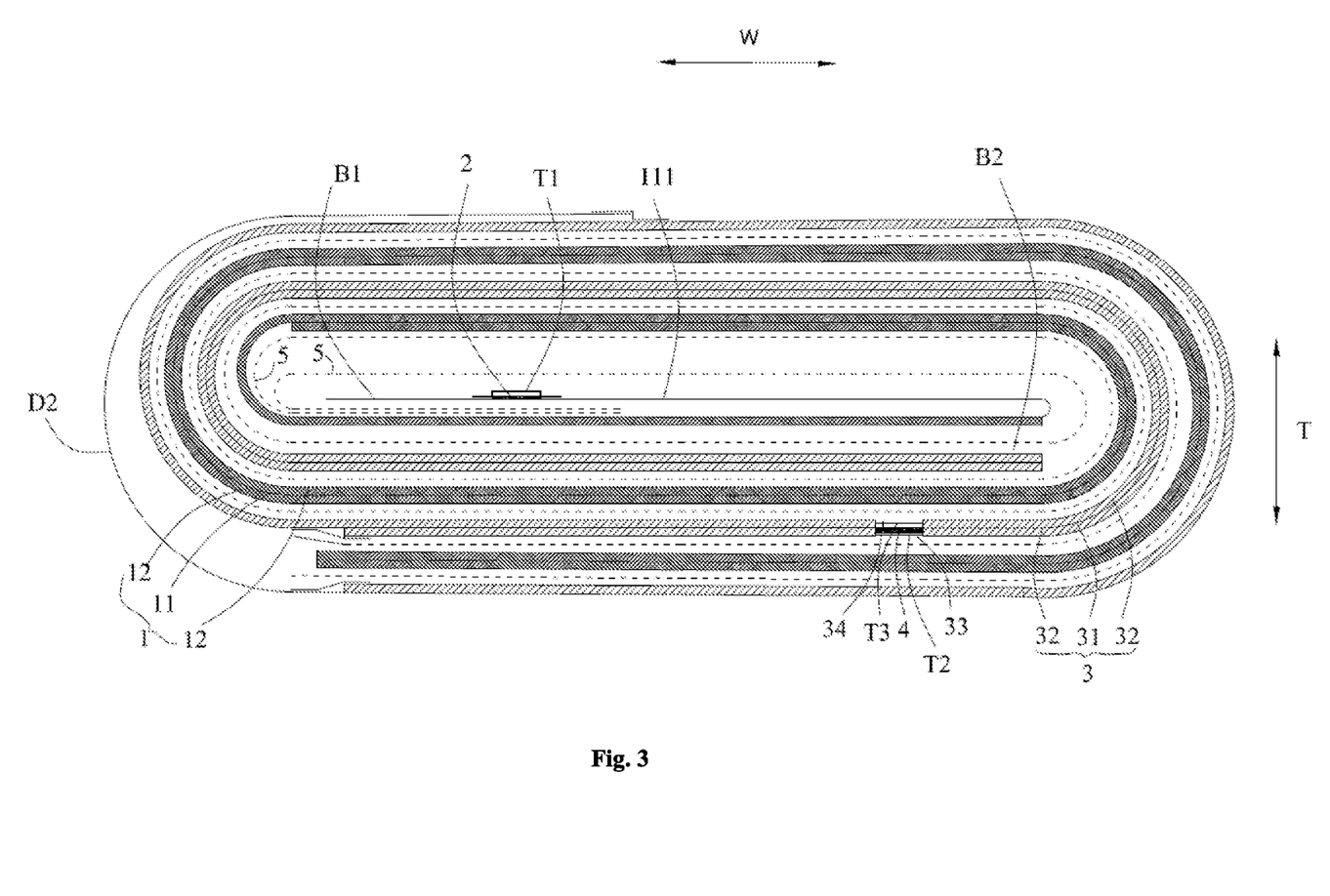
FIG. 3 illustrates a schematic view of winding of an embodiment of a wound-type electrode assembly according to the present disclosure.
Figure 4:
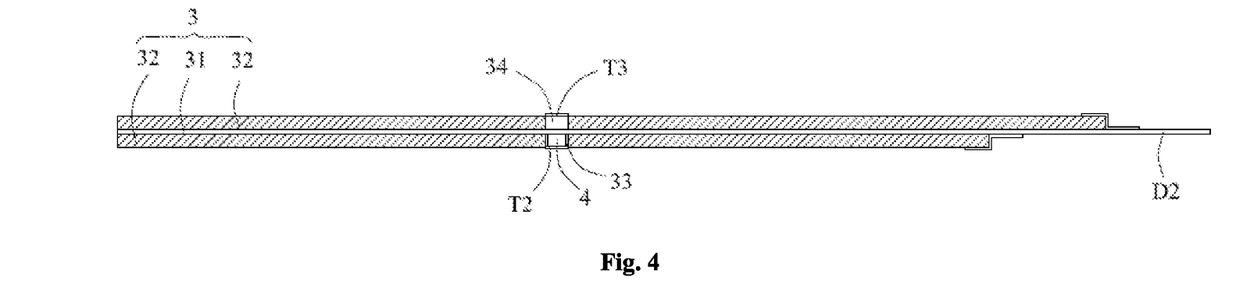
FIG. 4 illustrates a schematic view of the second electrode plate of FIG. 3 after unfolding.

In some embodiments, with reference to FIGS. 3 and 10, the second electrode plate 3 may further include a second winding end section D2, wherein two surfaces of the second current collector 31 of the second winding end section D2 may be coated with the second active substance layer 32. In some embodiments, only one side of the second current collector 31 of the second winding end section D2 may be coated with the second active substance layer 32. Alternatively, in some embodiments, the two surfaces of the second current collector 31 of the second winding end section D2 may not be coated with the second active substance layer 32.

In some embodiments, the second electrode tabs 4 may include two second electrode tab units, and correspondingly, the second grooves 33 may include two second groove units. The two second electrode tab units are respectively accommodated in the corresponding second grooves 33 and are substantially aligned in the thickness direction T of the wound-type electrode assembly.

It is additionally noted here that when the number of the first electrode tab 2 and the second electrode tab 4 is appropriately increased, the charge and discharge rate of the wound-type electrode assembly is correspondingly increased.

Figure 14:
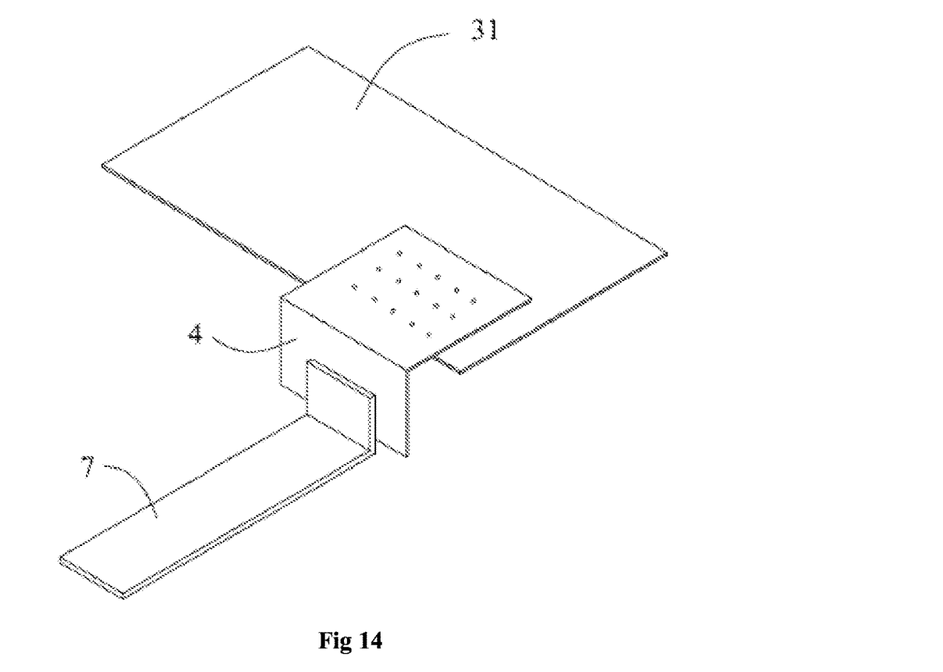
FIG. 14 illustrates a perspective view of welding of the second electrode tab and the fourth electrode tab of FIG. 3.
Figure 15:
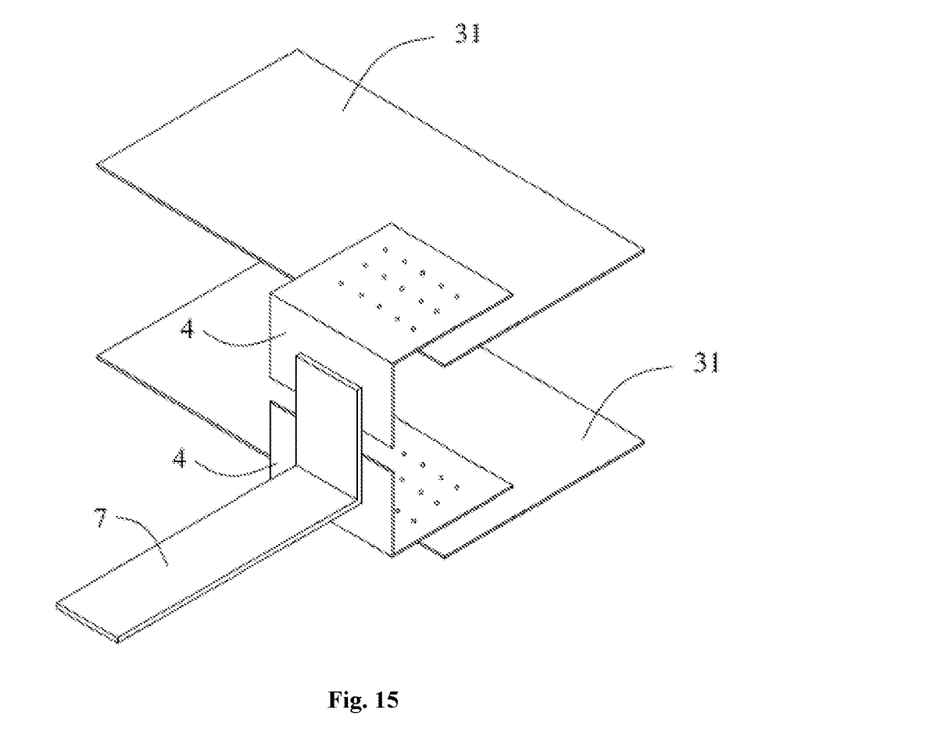
FIG. 15 illustrates a deformation view of FIG. 14, wherein the second electrode tab includes two second electrode tab units.

In some embodiments, with reference to FIGS. 14 and 15, the wound-type electrode assembly may further include a fourth electrode tab 7 welded to one end of the second electrode tab 4 extending to the outside of the wound-type electrode assembly.

In some embodiments, a width of the fourth electrode tab 7 is less than a width of the second electrode tab 4, and a thickness of the fourth electrode tab 7 is greater than a thickness of the second electrode tab 4, so that the maximum thickness of the electrode assembly after welding of the second electrode tab 4 is reduced and the energy density of the electrode assembly is increased while ensuring the strength and overcurrent cross-sectional area of the fourth electrode tab 7.

It is additionally noted here that the second groove 33 disposed in the middle of the second electrode plate 3 means that the second groove 33 is arranged on the portion of the second electrode plate 3 between the second winding start section B2 and the second winding end section D2. In some embodiments, the second groove 33 is arranged on the middle portion of the second electrode plate 3 between the second winding start section B2 and the second winding end section T2, so that the internal resistance of the wound-type electrode assembly may be obviously reduced.

In some embodiments, the first electrode tab 2 may be electrically connected to the first start blank current collector 111 by ultrasonic welding, laser welding or thermo-compression welding.

In some embodiments, the second electrode tab 4 may be electrically connected to the second current collector 31 at the second groove 33 by ultrasonic welding, laser welding or thermo-compression welding.

In some embodiments, with reference to FIGS. 3, 4, 9, 10 and 11, the second electrode plate 3 may further include a third groove 34, the third groove 34 is located on the opposite side of the second current collector corresponding to the second groove 33. A bottom of the third groove 34 is the second current collector 31 and a circumference of the third groove 34 is the second active substance layer 32. Similar to the second groove 33, the circumference of the third groove 34 may also be close on three sides and open on one side, and the circumference of the third groove 34 may also be close on two sides and open on two sides. Arranging the third groove 34 facilitates to weld the second electrode tab 4 into the second groove 33.

In some embodiments, by laser cleaning or mechanical cleaning, the second groove 33 may be formed by removing a corresponding portion of the second active substance layer 32 to expose the second current collector 31.

In some embodiments, the second groove 33 may be formed by preloading a heat-sensitive foaming tape on the second current collector 31 before coating a cathode slurry layer, then coating and drying the cathode slurry layer to form the second active substance layer 32, and peeling off the heat-sensitive foaming tape from the second current collector 31 when the cathode slurry layer is dried.

In some embodiments, by laser cleaning or mechanical cleaning, the third groove 34 may be formed by removing a corresponding portion of the second active substance layer 32 to expose the second current collector 31.

In some embodiments, the third groove 34 may be formed by preloading a heat-sensitive foaming tape on the second current collector 31 before coating a cathode slurry layer, then coating and drying the cathode slurry layer to form the second active substance layer 32, and peeling off the heat-sensitive foaming tape from the second current collector 31 when the cathode slurry layer is dried.

In some embodiments, the wound-type electrode assembly may further include a first double-sided insulating tape T1, two surfaces of the first double-sided insulating tape T1 are bonded respectively with the separator 5 and the first electrode tab 2.

In some embodiments, the wound-type electrode assembly may further include a second double-sided insulating tape T2, the second double-sided insulating tape T2 is used to cover the second electrode tab 4 and a portion of the second groove 33 around the second electrode tab 4.

In some embodiments, the wound-type electrode assembly may further include a third double-sided insulating tape T3 covering the entire third groove 34, and two surfaces of the third double-sided insulating tape T3 are bonded respectively with the separator 5 and the second active substance layer 32 around the third groove 34.

It is additionally noted here that since the first double-sided insulating tape T1, the second double-sided insulating tape T2 and the third double-sided insulating tape T3 are used, which have a bonding area closer than when using single-sided insulating tape, so that the integrity of the wound-type electrode assembly is enhanced, thereby preventing the bonding area of the wound-type electrode assembly from bulging into the largest deformation zone after the shaping process and the charge and discharge expansion. In some embodiments, the first double-sided insulating tape T1 is a double-sided tape in which two surfaces are initially tacky, or one side is initially tacky and the other side is tacky after subsequent hot pressing or cold pressing.

In some embodiments, the second double-sided insulating tape T2 is a double-sided tape in which two surfaces are initially tacky, or one side is initially tacky and the other side is tacky after subsequent hot pressing or cold pressing.

In some embodiments, the third double-sided insulating tape T3 is a double-sided tape in which two surfaces are initially tacky, or one side is initially tacky and the other side is tacky after subsequent hot pressing or cold pressing.

It is additionally noted here that the first double-sided insulating tape T1, the second double-sided insulating tape T2 and the third double-sided insulating tape T3 all may include a substrate and a glue layer coated on two surfaces of the substrate. The glue layer of the double-sided tape in which two surfaces are initially tacky may be a styrene butadiene rubber (SBR) layer, a polyurethane layer, a polyacrylate layer or a polyvinylidene fluoride layer. In the double-sided tape in which one side is initially tacky and the other side is tacky after subsequent hot pressing or cold pressing, the glue layer in which one side is initially tacky may be a styrene-butadiene rubber layer, a polyurethane layer, a polyacrylate layer or a polyvinylidene fluoride layer; the glue layer in which the other side is tacky after subsequent hot pressing or cold pressing may be a temperature-sensitive adhesive without initial tack at normal temperature or a pressure-sensitive adhesive without initial tack at room temperature.

In some embodiments, the size of the first electrode tab 2 may be the same as the size of the second electrode tab 4. For example, the first electrode tab 2 may have a width of 6 mm and a thickness of 0.06 mm. The second electrode tab 4 may have a width of 6 mm and a thickness of 0.06 mm.

In some embodiments, the first active substance layer 12 of the first electrode plate 1 may have a thickness of 131 μm, and the second active substance layer 32 of the second electrode plate 3 may have a thickness of 112 μm.

In some embodiments, the first electrode plate 1 is a positive electrode plate and the second electrode plate 3 is a negative electrode plate, the first current collector 11 is a positive current collector and the second current collector 31 is a negative current collector, and the first active substance layer 12 is a positive active substance layer and the second active substance layer 32 is a negative active substance layer.

In some embodiments, the first electrode plate 1 is a negative electrode plate and the second electrode plate 3 is a positive electrode plate, the first current collector 11 is a negative current collector and the second current collector 31 is a positive current collector, and the first active substance layer 12 is a negative active substance layer and the second active substance layer 32 is a positive active substance layer.

It is additionally noted here that the first winding start section B1 of the first electrode plate 1 described above is a layer of the first electrode plate 1 on the side adjacent to the winding center (i.e., immediately adjacent to the winding needle) in the thickness direction T of the wound-type electrode assembly (the first winding start section B1 may have only a flat portion, as shown in FIGS. 3, 9 and 10; or the layer of the first electrode plate 1 may have a flat portion and a back-folded portion that is folded back from the starting end of the flat portion, as shown in FIG. 11). The first winding end section D1 of the first electrode plate 1 is the first electrode plate 1 disposed on the outermost layer of the wound-type electrode assembly. The second winding start section B2 of the second electrode plate 2 described above is a layer of the second electrode plate 2 on the other side adjacent to the winding center in the thickness direction T of the wound-type electrode assembly (similarly, the second winding start section B2 may have only a flat portion, as shown in FIGS. 3, 9 and 10; or the layer of the second electrode plate 2 may have a flat portion and a folded back portion that is back-folded from the flat portion, as shown in FIG. 11). The second winding end section D2 of the second electrode plate 2 is the second electrode plate 2 disposed on the outermost layer of the wound-type electrode assembly.

Finally, it is noted additionally that the wound-type electrode assembly according to the disclosure is used for flexible packaging lithium ion battery and as exemplary embodiment, comparative example and test result. Among them, in the embodiments and comparative examples described as below, the first electrode plate 1 is a negative electrode plate, and the second electrode plate 3 is a positive electrode plate.

Embodiment 1

Taking 464090 Type flexible packaging lithium ion battery (finished battery with a thickness of 4.6 mm, a width of 40 mm, a length of 90 mm) as an example, the first electrode tab 2 is identical in size to the second electrode tab 4, that is, the electrode tab has a welding length of 15 mm, a tab width of 6 mm, and a thickness of 0.06 mm.

Using the structure shown in FIG. 3, the electrode plate is subject to the cold pressing process (the one-side first active substance layer 12 of the first electrode plate 1 has a thickness of 131 μm, and the one-side second active substance layer 32 of the second electrode plate 3 has a thickness of 112 μm.), the first electrode tab 2 is welded to the first start blank current collector 111 of the first electrode plate 1 by ultrasonic welding or brazing or electric resistance welding. The second groove 33 and the third groove 34 for welding the second electrode tab 4 are cleaned or reserved in the middle of the second electrode plate 3 by laser or space-occupying method, and then the second electrode tab 4 is welded to the second groove 33 by ultrasonic welding or brazing or electric resistance welding. The first active substance layer 12 is made of graphite, and the second active substance layer 32 is made from lithium cobaltate (LCO). The circumference of the second groove 33 is close on three sides and is open on one side.

Embodiment 2

The difference from Embodiment 1 is as follows: the circumference of the second groove 33 is close on two sides and is open on two sides.

Comparative Example 1

Using the structure shown in FIG. 15, the difference from Embodiment 1 is as follows: no grooves are formed in the second electrode plate 3 and the first electrode plate 1, the first electrode tab 2 is welded to the first start blank current collector 111 of the first winding start section B1 of the first electrode plate 1. The second electrode tab 4 is welded to the second start blank current collector 31 of the second winding start section B2 of the second electrode plate 3.

Comparative Example 2

Using the structure shown in FIG. 1, the difference from Embodiment 1 is as follows: the first electrode plate 1 includes a first groove 13 for accommodating the first electrode tab 2, the second electrode plate 3 includes a second groove 33 for accommodating the second electrode tab 4. The first electrode tab 2 is welded to the first groove 13, and the second electrode tab 4 is welded to the second groove 33.

In Embodiments 1-2 and Comparative Examples 1-2, 20 flexible packaging lithium ion battery samples are selected for 1000 cycles of charge and discharge tests, the thicknesses of the samples before and after the test are measured, and the samples of the flexible packaging lithium ion battery are disassembled after the test to observe the lithium deposition situation. The obtained results are shown in Table 1.

Capacity test: a nominal current is used to charge the electrode assembly to a nominal upper limit voltage, and then discharging is performed with a nominal current to reach the amount of power released by the cut-off voltage.

Thickness test: measured with a thickness gauge.

Deformation=(average thickness after test−thickness before test)/thickness before test*100%.

TABLE 1

Test results for Embodiments 1-2 and Comparative Examples 1-2

| | average capacity/mAh | average thickness after test/mm | DC Resistance/ mΩ | deformation/ % |
|---|---|---|---|---|
| Embodiment 1 | 2835 | 4.894 | 50 | 6.4% |
| Embodiment 2 | 2825 | 4.805 | 49 | 4.5% |
| Comparative Example 1 | 2800 | 4.899 | 65 | 6.5% |
| Comparative Example 2 | 2845 | 4.995 | 47 | 8.6% |

What is claimed is:

1. A wound-type electrode assembly, comprising:
a first electrode plate comprising:
a first current collector;
a first active substance layer coated on the surface of the first current collector; and
a first electrode tab;
a second electrode plate comprising:
a second current collector;
a second active substance layer coated on the surface of the second current collector; and
a second electrode tab;
a separator disposed between the first electrode plate and the second electrode plate to isolate the first electrode plate from the second electrode plate;
wherein the first electrode plate comprises a first winding start section, two surfaces of the first current collector of the first winding start section are not coated with the first active substance layer and are defined as a first start blank current collector, and the first electrode tab is fixed to the first start blank current collector;
a middle of the second electrode plate comprises a second groove, a bottom of the second groove is the second current collector and a circumference thereof is the second active substance layer; and the second electrode tab is accommodated in the second groove and electrically connected to the second current collector at the second groove and the second electrode plate further comprises a third groove located on an opposite side of the second current collector corresponding to the second groove, a bottom of the third groove is the second current collector and a circumference thereof is the second active substance layer;
wherein the wound-type electrode assembly further comprises a third double-sided insulating tape covering the entire third groove, and bonded respectively with the separator and the second active substance layer around the third groove by two surfaces of the third double-sided insulating tape; and
the separator comprises a separator winding start section, wherein the separator winding start section is located between the first start blank current collector and a portion of the first electrode plate in a thickness direction of the wound-type electrode assembly, the portion of the first electrode plate being next to the first winding start section along a winding direction of the wound-type electrode assembly and having one surface facing away from the separator winding start section coated with the first active substance layer.

2. The wound-type electrode assembly according to claim 1, wherein,
the circumference of the second groove is closed on three sides and open on one side; or
the circumference of the second groove is closed on two sides and open on two sides.

3. The wound-type electrode assembly according to claim 1, wherein, the second electrode plate comprises a second winding start section;
in a width direction of the wound-type electrode assembly, the first winding start section and the second winding start section respectively extend toward opposite directions; or
in a width direction of the wound-type electrode assembly, the first winding start section and the second winding start section extend toward the same direction.

4. The wound-type electrode assembly according to claim 3, wherein,
two surfaces of the second current collector of the second winding start section are coated with the second active substance layer.

5. The wound-type electrode assembly according to claim 3, wherein,
the first electrode plate further comprises a first winding end section; two surfaces of the first current collector of the first winding end section are not coated with the first active substance layer and are defined as a first end blank current collector.

6. The wound-type electrode assembly according to claim 5, wherein, the first electrode tab comprises two first electrode tab units;
one of the two first electrode tab units is welded to the first start blank current collector and the other of the two first electrode tab units is welded to the first end blank current collector.

7. The wound-type electrode assembly according to claim 1, wherein the wound-type electrode assembly further comprises a third electrode tab welded to one end of the first electrode tab extending to an outside of the wound-type electrode assembly, and a width of the third electrode tab is less than a width of the first electrode tab, and a thickness of the third electrode tab is greater than a thickness of the first electrode tab.

8. The wound-type electrode assembly according to claim 1, wherein,
the second electrode plate further comprises a second winding end section, two surfaces of the second current collector of the second winding end section are coated with the second active substance layer, or only one surface thereof is coated with the second active substance layer, or the two surfaces thereof are not coated with the second active substance layer.

9. The wound-type electrode assembly according to claim 1, wherein the second electrode tab comprises two second electrode tab units, and correspondingly, the second groove comprises two second groove units.

10. The wound-type electrode assembly according to claim 1, wherein,
the wound-type electrode assembly further comprises a fourth electrode tab welded to one end of the second electrode tab extending to an outside of the wound-type electrode assembly, and a width of the fourth electrode tab is less than a width of the second electrode tab, a thickness of the fourth electrode tab is greater than a thickness of the second electrode tab.

11. The wound-type electrode assembly according to claim 1, wherein the first electrode tab is electrically connected to the first start blank current collector by ultrasonic welding, laser welding or thermo-compression welding.

12. The wound-type electrode assembly according to claim 1, wherein the second electrode tab is electrically connected to the second current collector at the second groove by ultrasonic welding, laser welding or thermo-compression welding.

13. The wound-type electrode assembly according to claim 1, wherein the wound-type electrode assembly further comprises a first double-sided insulating tape bonded respectively with the separator and the first electrode tab by two surfaces of the first double-sided insulating tape.

14. The wound-type electrode assembly according to claim 1, wherein the wound-type electrode assembly further comprises a second double-sided insulating tape covering the second electrode tab and a portion of the second groove around the second electrode tab.

15. The wound-type electrode assembly according to claim 1, wherein the first electrode plate is a positive electrode plate; or
the first electrode plate is a negative electrode plate.

16. The wound-type electrode assembly according to claim 1, wherein:
at least a portion of an innermost roll of the first electrode plate including the first winding start section is located between the first electrode tab and the second electrode tab in the thickness direction of the wound-type electrode assembly.

17. A lithium-ion battery comprising a wound-type electrode assembly according to claim 1.

* * * * *